(12) United States Patent
Mimran

(10) Patent No.: US 7,165,878 B1
(45) Date of Patent: Jan. 23, 2007

(54) ICE CREAM AND TOPPING MIXING ATTACHMENT

(76) Inventor: Emile Mimran, 255 Monmouth Rd., 2nd Floor, Oakhurst, NJ (US) 07755

( * ) Notice: Subject to any disclaimer, the term of this patent is extended or adjusted under 35 U.S.C. 154(b) by 0 days.

(21) Appl. No.: 11/234,546

(22) Filed: Sep. 23, 2005

(51) Int. Cl.
*B01F 15/02* (2006.01)
*B01F 3/14* (2006.01)

(52) U.S. Cl. ................... 366/177.1; 366/183.1

(58) Field of Classification Search ............ 366/177.1, 366/183.1, 183.2, 183.4, 341; 118/13, 308, 118/310; 99/348; 426/289, 101, 249
See application file for complete search history.

(56) References Cited

U.S. PATENT DOCUMENTS

| | | | | |
|---|---|---|---|---|
| 2,284,651 A | * | 6/1942 | Gundlach et al. ............ 426/249 |
| 2,313,060 A | * | 3/1943 | Friedman .................... 425/132 |
| 2,389,084 A | * | 11/1945 | Routh ...................... 366/169.2 |
| 2,409,339 A | * | 10/1946 | Ballard ..................... 366/177.1 |
| 2,646,757 A | * | 9/1953 | Hackmann ................... 426/249 |
| 2,689,537 A | * | 9/1954 | Peyton ........................ 426/249 |
| 2,774,314 A | * | 12/1956 | Moser ......................... 426/249 |
| 2,816,518 A | * | 12/1957 | Daggett .................... 222/145.6 |
| 3,014,437 A | * | 12/1961 | Dutchess .................... 366/76.6 |
| 3,147,717 A | * | 9/1964 | Smith ....................... 425/131.1 |
| 3,181,838 A | * | 5/1965 | Johansen .................. 366/177.1 |
| 4,627,555 A | * | 12/1986 | Locke ......................... 222/200 |
| 4,873,104 A | * | 10/1989 | Butcher et al. ............. 426/249 |
| 5,292,030 A | * | 3/1994 | Kateman et al. ................ 62/74 |
| 5,698,251 A | * | 12/1997 | Dahms et al. .............. 426/249 |
| 5,743,639 A | * | 4/1998 | Puerner et al. .......... 366/182.1 |
| 5,820,913 A | * | 10/1998 | Grassler et al. ............. 426/564 |
| 6,494,612 B1 | * | 12/2002 | Johanson .................... 366/228 |
| 6,514,555 B1 | * | 2/2003 | Fayard et al. ............... 426/565 |
| 6,955,829 B1 | * | 10/2005 | Binley et al. ............... 426/101 |

* cited by examiner

*Primary Examiner*—Tony G. Soohoo
(74) *Attorney, Agent, or Firm*—Ezra Sutton, Esq.

(57) ABSTRACT

An ice cream and topping mixing attachment for being detachably connected to an ice cream dispenser for the mixing in of a topping ingredient with ice cream. The mixing attachment includes a mixing machine housing having a connector assembly, a topping chamber having a topping ingredient contained therein connected to the connector assembly, a topping chamber support plate connected to the topping chamber and a mixing chamber assembly connected to the topping chamber support plate for mixing, blending and dispensing of the topping ingredient and ice cream within the mixing chamber assembly and a cylindrically-shaped dispensing nozzle for dispensing the mixed topping ingredient and ice cream to a user.

24 Claims, 12 Drawing Sheets

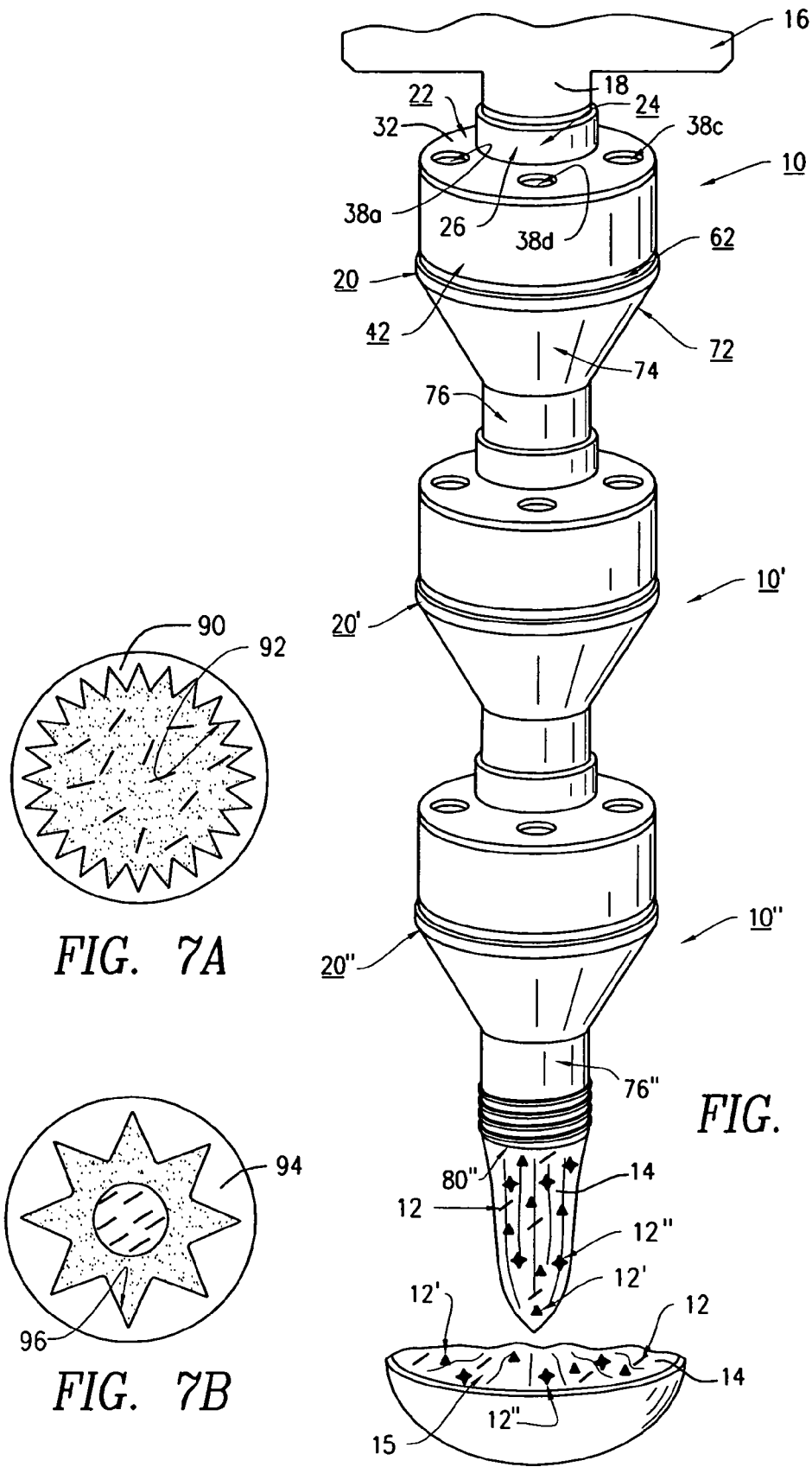

ICE CREAM AND TOPPING MIXING ATTACHMENT

FIELD OF THE INVENTION

The present invention relates to an ice cream and topping mixing attachment for an ice cream extruder. More particularly, this mixing attachment includes a plastic, paper, cardboard or metal, detachable and disposable and/or re-useable assembly having a prefilled topping chamber containing topping ingredients therein for being attached to a soft ice cream extruder.

BACKGROUND OF THE INVENTION

Ingredient feeders are well known in the art for use in various food processing applications in order to introduce one or more ingredients into a flowable base product. For example, ingredient feeders may be used to mix ingredients such as fruits, nuts, candies, or the like into base products such as ice cream, peanut butter, cake batter, pancake batter and the like. Typically, ingredient feeders are incorporated within the overall structure of a food processing apparatus, for example, a soft ice cream extruder apparatus. This makes such machines overly complex and complicated for maintenance, repair and changing of ingredients, as well as the cleaning of the interior ingredient feeder.

There remains a need for an ice cream and topping mixing attachment (ingredient feeder) that is disposable and has a detachable prefilled topping chamber containing topping ingredients therein for being detachably connected to a soft ice cream extruder.

DESCRIPTION OF PRIOR ART

Ingredient feeders, dispensing machines for soft-serve products and the like having various designs, structures, configurations and materials of construction have been disclosed in the prior art. For example, U.S. Pat. No. 5,743,639 to NORMAN discloses an ingredient feeder that meters a selected amount of an ingredient into a flowable food product including an enrobing chamber subtended by a blending tube. The blending tube houses an agitator assembly that moves the continuous flow of ingredient in both axial and radial directions as it mixes the ingredient with the flowable food product. The ingredient feeder can be used to introduce any ingredient which is in the form of generally solid or semi-solid pieces into any type of base product which is pumpable. In addition, the ingredient feeder includes a means which allows ingredients such as liquids and slurries to be introduced into the base product either separately or simultaneously with the substantially solid ingredients. Furthermore, the ingredient feeder is adapted to disperse the ingredient in the base product in a manner which prevents plugging and produces a consistent final product. The ingredient feeder is also easily adapted for applications having differing base product flow rates and is easily installed into existing production lines. This prior art patent does not disclose or teach the design, structure and configuration of the ice cream and topping mixing attachment of the present invention.

U.S. Pat. No. 6,145,701 to PUERNER et al. discloses a machine for dispensing a soft-serve product comprising a freezer barrel and a mix hopper for containing soft-serve mix. The mix hopper is in flow communication with the freezer barrel so that soft-serve mix can flow from the mix hopper into the freezer barrel. A flow passage is provided which leads from the freezer barrel to a draw spout. Also a beater assembly is provided for expelling frozen product from the freezer barrel via the flow passage to the draw spout. A solids hopper for containing a flowable solid topping is further provided, and an archimedes screw for feeding the solid topping from the solids hopper into the flow stream of soft-serve product as it passes through the flow passage. A vaned rotor and a rotation sensor meter the flow of soft-serve product through the flow passage and control the speed of a topping motor driving the archimedes screw. This prior art patent does not disclose or teach the design, structure and configuration of the ice cream and topping attachment of the present invention.

None of these prior art patents teach or disclose the structure and configuration of an ice cream and topping mixing attachment to an ice cream dispenser for dispensing a topping ingredient within the soft serve ice cream being dispensed from a soft serve ice cream machine.

Accordingly, it is an object of the present invention to provide an ice cream and topping mixing attachment to an ice cream dispenser for dispensing a topping ingredient within the soft ice cream.

Another object of the present invention is to provide an ice cream and topping mixing attachment being detachable and disposable (made from plastic material) having a prefilled topping chamber containing topping ingredients therein which is detachably connected to a standard soft ice cream machine. Alternately, the topping chamber can be filled manually at the time of dispensing the soft ice cream.

Another object of the present invention is to provide an ice cream and topping mixing attachment that mixes and blends the topping ingredient and the soft ice cream within a mixing chamber and the mixed blend is then dispensed from a dispensing nozzle.

Another object of the present invention is to provide an ice cream and topping and mixing attachment that can be easily attached to a second ice cream and topping mixing attachment such that multiple topping ingredients may be added to a serving of soft ice cream.

Another object of the present invention is to provide an ice cream and topping mixing attachment that uses an optional mixing blade to blend and/or twirl the topping ingredient and the soft ice cream together, and an optional molding (star mold) blade when dispensing the mixture.

Another object of the present invention is to provide an ice cream and topping mixing attachment that uses a topping ingredient selected from the group consisting of dried fruit pieces, crushed nuts, candy pieces, seeds, coconut flakes, miniature marshmallows, sprinkles, syrups, chocolate chips and the like.

Another object of the present invention is to provide an ice cream and topping mixing attachment that can be mass produced in an automated and economical manner and is readily affordable by the store owner and/or manufacturer.

SUMMARY OF THE INVENTION

In accordance with the present invention, there is provided an ice cream and topping mixing attachment for the mixing of a topping ingredient with ice cream. The ice cream and topping mixing attachment includes a mixing machine housing having a connector assembly, a topping chamber having a topping ingredient therein connected to the connector assembly, a topping chamber support plate connected to the topping chamber, and a mixing chamber assembly connected to the topping chamber support plate for mixing and blending of the topping ingredient and ice cream within the mixing chamber assembly and for dispensing the mixed topping ingredient and ice cream.

The connector assembly includes an upper connector member for detachably connecting the ice cream and topping mixing attachment to a standard soft ice cream machine, and a support covering plate connected to the upper connector member; the support covering plate having a connector assembly opening for receiving ice cream therethrough from the ice cream machine and also having a plurality of spaced-apart air vents for allowing the free flow of topping ingredient from the topping chamber to the mixing chamber assembly. The topping chamber includes an upper plate having a plurality of spaced-apart air vents, a lower plate having first product outlet openings, the upper and lower wall being connected to inner and outer perimeter walls for forming an interior circular chamber for holding the topping ingredient therein. The topping chamber has a topping chamber opening extending therethrough for receiving ice cream therethrough from the ice cream machine. The topping chamber support plate includes second product outlet openings within the support plate and a support plate opening for receiving ice cream therethrough from the ice cream machine.

The mixing chamber assembly includes a conically-shaped mixing chamber connected to a cylindrically-shaped dispersion nozzle for forming an interior mixing chamber. The mixing chamber assembly further includes an interior guiding cone disposed therein and connected to an interior guiding cylinder having curved-shaped product chutes with product chute openings for the release and blending of the topping ingredient with the ice cream within the interior mixing chamber; and the dispersion nozzle for the dispersion of the blended topping ingredient within the ice cream from the mixing machine assembly to a user.

BRIEF DESCRIPTION OF DRAWINGS

Further objects, features and advantages of the present invention will become apparent upon the consideration of the following detailed description of the presently preferred embodiment when taken in conjunction with the accompanying drawings, wherein:

FIG. 7 is a perspective view of the ice cream and topping mixing attachment of the present invention showing multiple mixing machine assemblies connected with each other;

FIG. 7A is a schematic diagram of the ice cream and topping mixing attachment of the present invention showing the topping ingredient and the ice cream after discharge being totally mixed using a mixing blade and the star blade from the dispersion nozzle;

FIG. 7B is a schematic diagram of the ice cream and topping mixing attachment of the present invention showing the topping ingredient within a center area of the ice cream of the ice cream after discharge using a star blade from the dispersion nozzle;

DETAILED DESCRIPTION OF THE EMBODIMENTS

Preferred Embodiment 10

Figures 1, 1A:
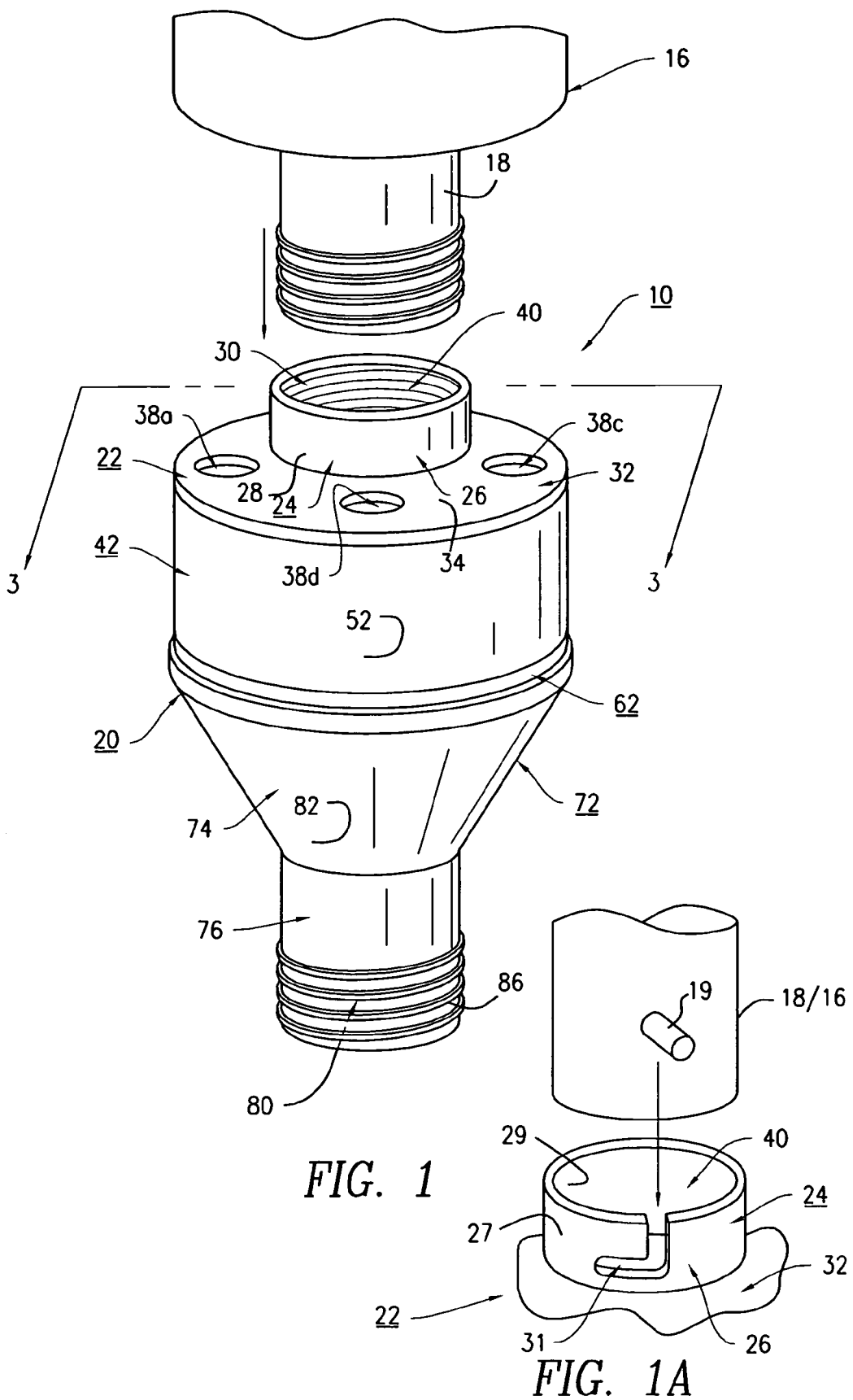
FIG. 1 is a perspective view of the ice cream and topping mixing attachment of the preferred embodiment of the present invention showing the major component parts thereto and in assembled state being readied for operational use.
FIG. 1A is a perspective view of the ice cream and topping mixing attachment of the present invention showing a lock and key pin for attaching the dispensing extruder nozzle to the connector assembly.
Figure 2:
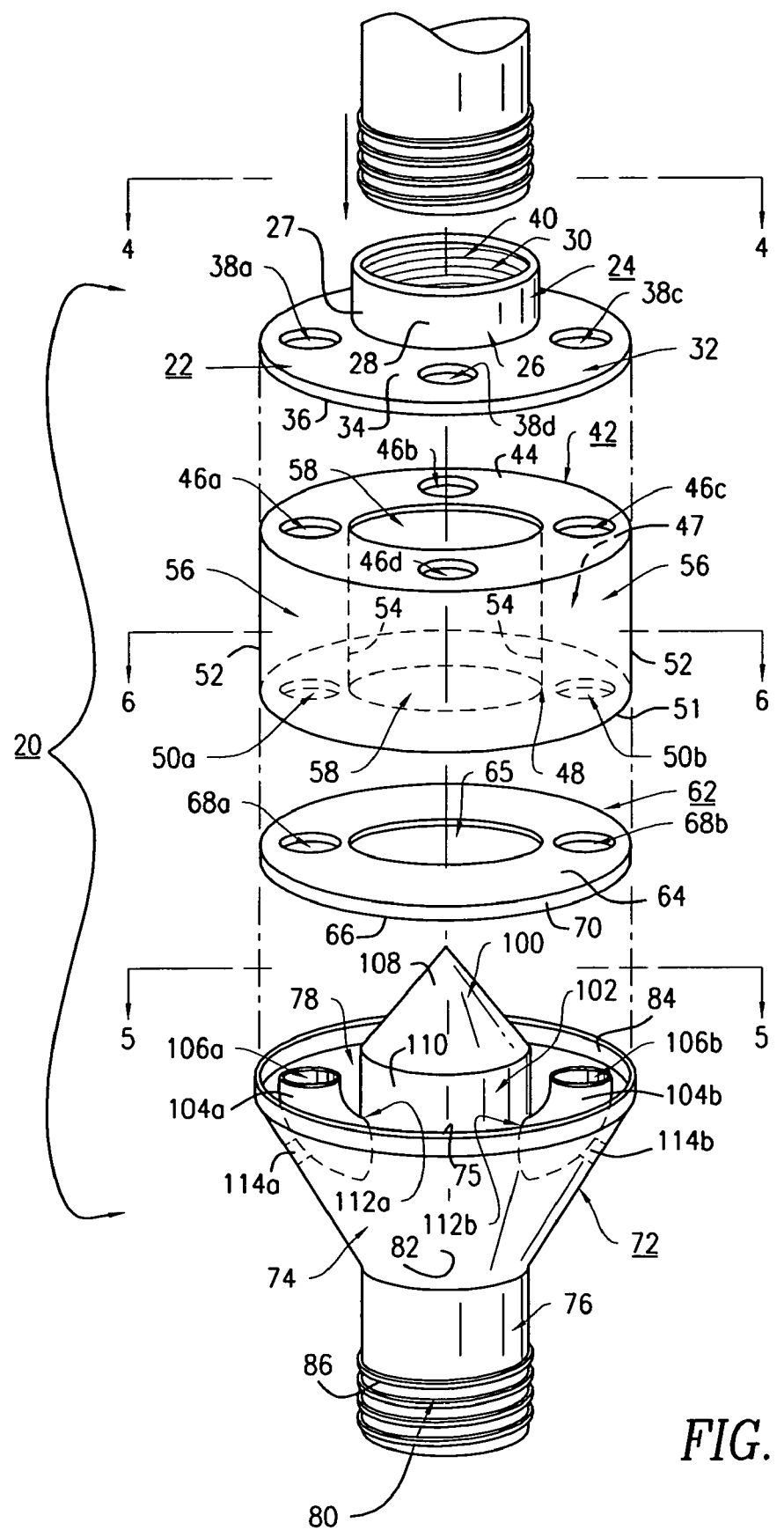
FIG. 2 is an exploded perspective view of the ice cream and topping mixing attachment of the present invention showing a connector assembly, a topping chamber, a topping chamber support plate and a mixing chamber assembly.
Figure 3:
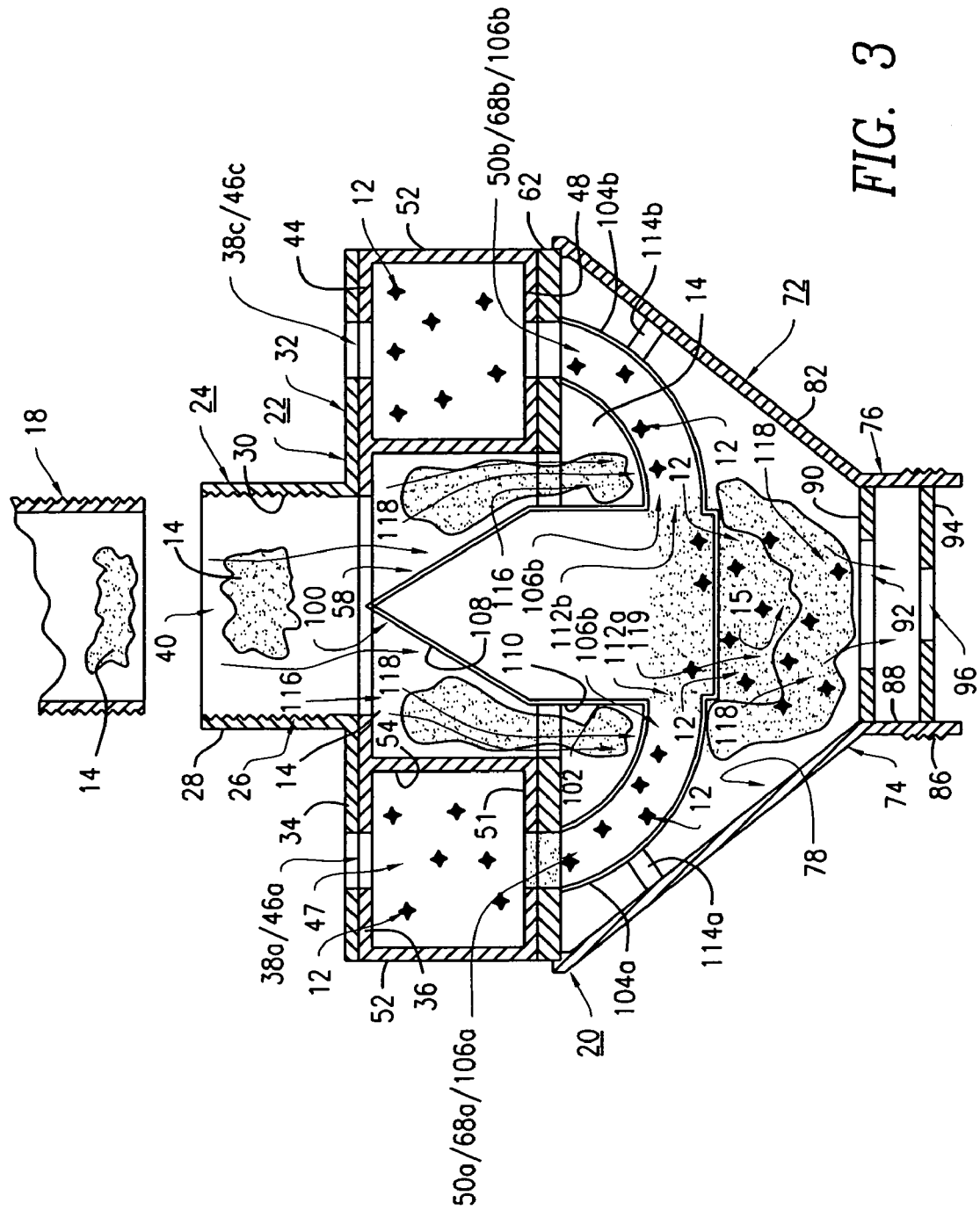
FIG. 3 is a cross-sectional view of the ice cream and topping mixing attachment of the present invention taken along lines 3—3 of FIG. 1 in the direction of the arrows showing the flow of soft ice cream and the topping ingredient being blended within the mixing machine assembly.
Figure 4:
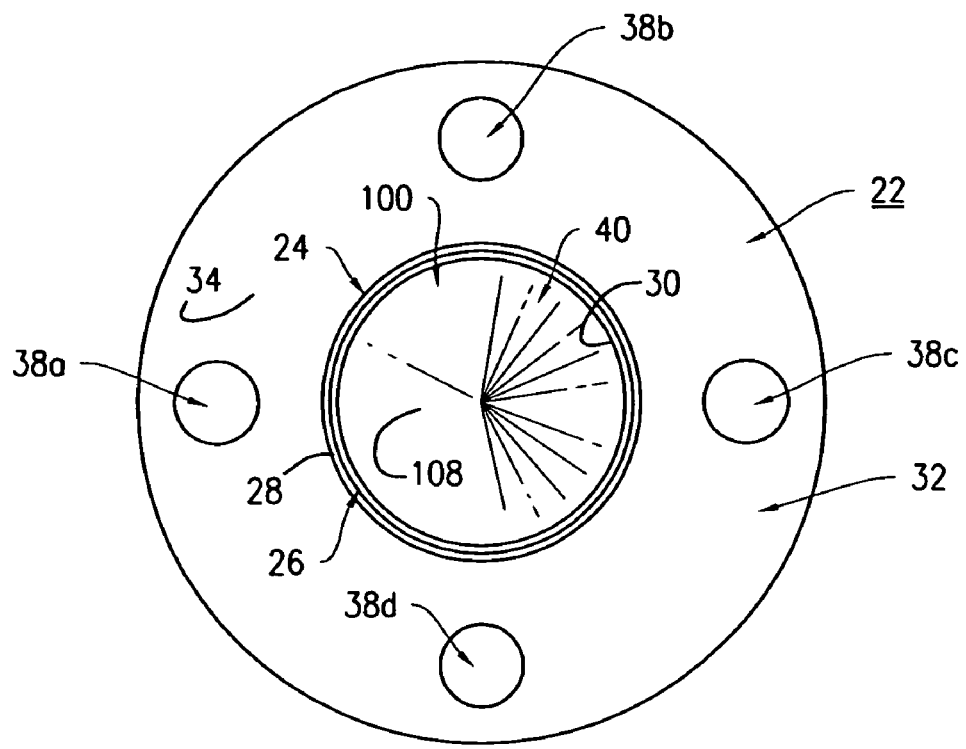
FIG. 4 is a top plan view of the ice cream and topping mixing attachment of the present invention taken along lines 4—4 of FIG. 2 showing the connector assembly and an interior guiding cone within the mixing chamber assembly.
Figure 5:
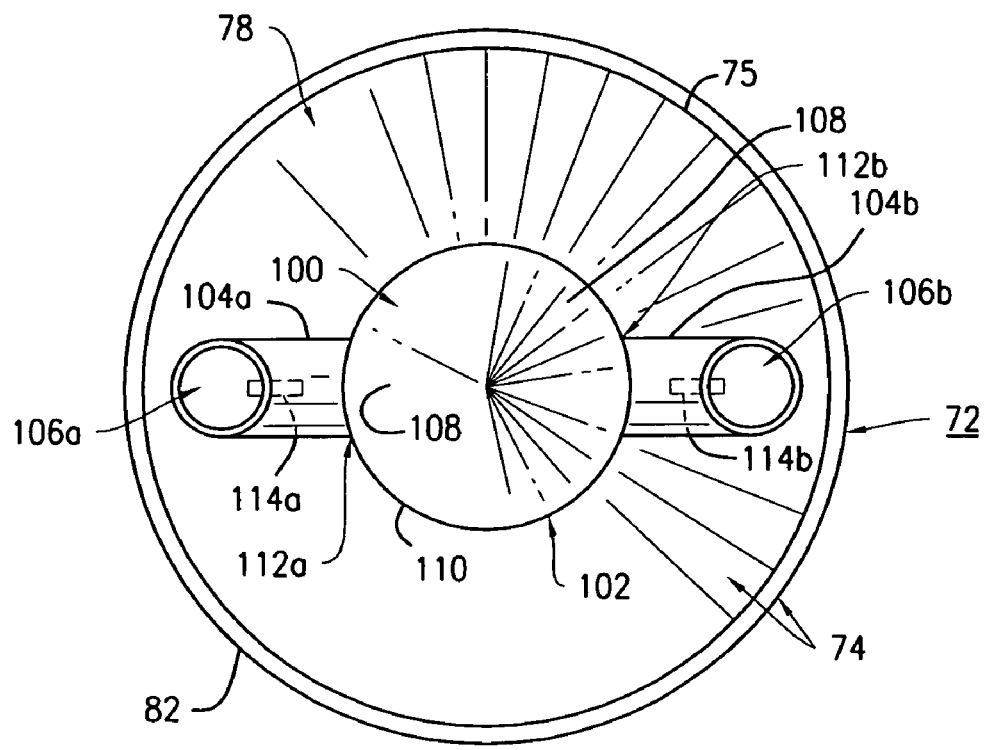
FIG. 5 is a top plan view of the ice cream and topping mixing attachment of the present invention taken along lines 5—5 of FIG. 2 showing the interior guiding cone and a pair of opposing curve-shaped product chutes for dispensing of a topping ingredient from the interior mixing chamber.

The ice cream and topping mixing attachment 10 and its component parts of the preferred embodiment of the present invention is represented in detail by FIGS. 1 through 7 of the patent drawings. The ice cream and topping mixing attachment 10 is used for the mixing and blending of a topping ingredient 12 within soft ice cream 14 dispensed from a soft ice cream extrusion machine 16, as shown in FIG. 3 of the drawings.

As shown in FIGS. 1 through 3 of the drawings, the ice cream and topping mixing attachment or ingredient mixing assembly 10 includes a mixing assembly housing 20 having a connector assembly 22, and a topping chamber 42 having a topping ingredient 12 therein for being connected to the connector assembly 22. The mixing assembly housing 20 also includes a topping chamber support plate 62 being connected to the topping chamber 42 and a mixing chamber assembly 72 being connected to the topping chamber support plate 62. The mixing chamber assembly 72 is used for mixing, blending and dispensing of the topping ingredient 12 and soft ice cream 14 within the mixing chamber assembly 72 and dispensing the mixed topping ingredient 12 and ice cream 14 from the ingredient mixing assembly 10.

The mixing assembly housing 20 and its major component parts 22, 42, 62 and 72 are made from durable and rigid plastic materials or made from durable and rigid (plastic coated) cardboard, or other strengthened paper products. After using the topping ingredient 12 within the topping chamber 42, then the ingredient mixing assembly 10 can be discarded and disposed in a conventional manner and replaced with another second ingredient mixing assembly 10 having another reservoir of the same or different topping ingredient 12 within the topping chamber 42 of the ingredient mixing assembly 10 of the present invention.

As shown in FIG. 2, the connector assembly 22 includes an upper connector member 24 integrally connected to a support covering plate 32 having a connector assembly opening 40 therethrough. The upper connector member 24 includes a circular perimeter wall 26 having an outer surface 28 and an inner threaded wall surface 30. The threaded wall surface 30 of upper connector member 24 is used for detachably connecting to a dispensing extruder nozzle 18 of the soft ice cream extrusion machine 16, as shown in FIG. 1. The support covering plate 32 includes a top surface 34 and a bottom surface 36. The support covering plate 32 further includes a plurality of equally spaced-apart air vent openings 38a, 38b, 38c and 38d extending therethrough.

In the alternate design shown in FIG. 1A, the connector assembly 22 includes the upper connector member 24 being integrally connected to the support covering plate 32 having the connector assembly opening 40 therethrough. The upper connector member 24 includes the circular perimeter wall 26 having an outer surface 27, an inner surface 29 and an L-shaped locking channel 31 therein. The L-shaped locking channel 31 of the upper connector member 24 is used for detachably connecting to a bayonet-type connector tab 19 on a dispensing extruder nozzle 18 of the soft ice cream extrusion machine 16, as shown in FIG. 1A. It is understood that other attachment means for connecting the dispensing extruder nozzle 18 to the soft ice cream extrusion machine 16 are screw; lock and key; suction; pressure; flat plate male to female connectors and the like.

As shown in FIGS. 2 and 3, the topping chamber 42 includes an upper plate 44 having a plurality of equally spaced-apart air vent openings 46a, 46b, 46c and 46d therethrough, a lower plate 48 having a pair of opposing product ingredient outlet openings 50a and 50b, an outer circular perimeter wall 52 and an inner circular perimeter wall 54 for forming an interior chamber 56 holding of a topping ingredient 12 therein and for forming a topping chamber opening 58 for receiving the soft ice cream 14 therethrough. The interior chamber 56 can hold typical topping ingredients 12 selected from the group consisting of dried or hydrated fruit pieces, crushed nuts, candy pieces, seeds, coconut flakes, malt, miniature marshmallows, sprinkles, syrups, chocolate chips and the like.

Figure 6:
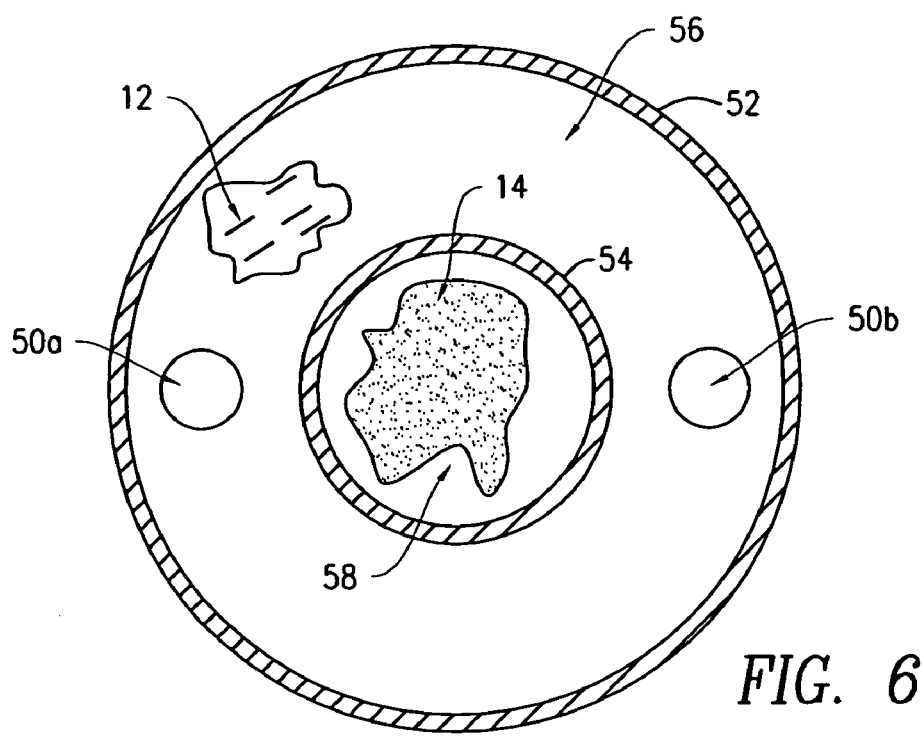
FIG. 6 is a top plan view of the ice cream and topping mixing attachment of the present invention taken along lines 6—6 of FIG. 2 showing a circular interior chamber of the topping chamber for holding of topping ingredients therein.
Figure 6A:
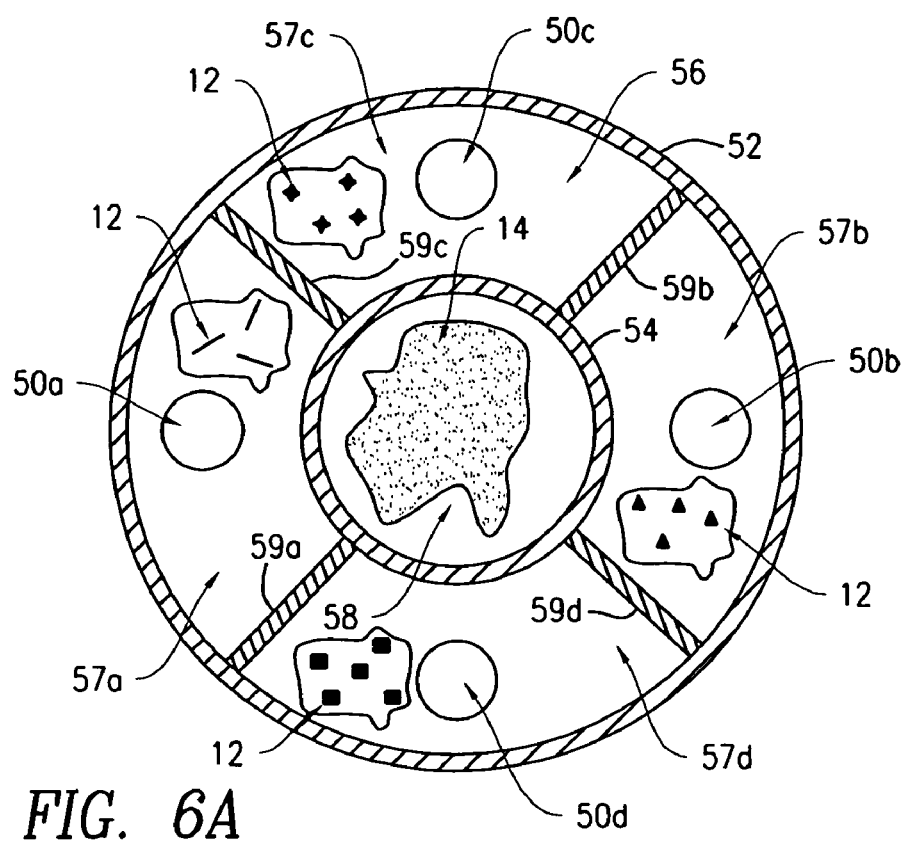
FIG. 6A is a top plan/cross-sectional view of the ice cream and topping mixing attachment of the present invention showing the circular interior chamber having a plurality of sub-chambers for holding multiple topping ingredients therein.

In the alternate design shown in FIG. 6A, the interior chamber 56 can be subdivided into sub-chambers 57a, 57b, 57c and 57d where multiple topping ingredients 12 can be dispensed at the same time. Each sub-chamber 57a to 57d can have one or more chutes 50a, 50b, 50c and 50d therein to accommodate the release of the multiple topping ingredients 12 therethrough, as shown in FIG. 6A of the drawings. Further, the sub-chambers 57a to 57d include interior dividing walls 59a, 59b, 59c and 59d for forming the aforementioned sub-chambers 57a, 57b, 57c and 57d, respectively.

As depicted in FIGS. 2 and 3 of the drawings, the topping chamber support plate 62 includes an top surface 64 and a bottom surface 66. The topping chamber support plate 62 further includes a support plate opening 65 and a pair of opposing product ingredient outlet openings 68a and 68b being adjacent to an outer circular perimeter edging 70. The topping chamber support plate 62 is used for additional structural support of the prefilled topping chamber 42 having its topping ingredient 12 therein.

As shown in FIGS. 2 and 3 of the drawings, the mixing chamber assembly 72 includes a conically-shaped mixing chamber 74 being integrally connected to a cylindrically-shaped dispensing nozzle 76 for forming an interior mixing chamber 78 and a nozzle outlet opening 80. The conically-shaped mixing chamber 74 includes an outer surface 82 and an inner surface 84. The cylindrically-shaped dispersion nozzle 76 includes an outer threaded perimeter wall surface 86 and an inner perimeter surface 88. The cylindrically-shaped dispensing nozzle 76 also includes an optional upper mixing blade 90 having a mixing blade opening 92 and an optional lower star blade 94 having a star-shaped opening 96. It is understood blade 94 can have other shaped openings 96 in the form of a circle, a square, an octagon, a diamond and the like.

As shown in FIGS. 2 and 3, the mixing chamber assembly 72 further includes an interior guiding cone 100 disposed therein and integrally connected to an interior guiding cylinder 102 having a pair of opposing curved-shaped product chutes 104a and 104b with product chute openings 106a and 106b therethrough for the release and blending of the topping ingredient 12 with the soft ice cream 14 within the interior mixing chamber 78. The interior guiding cone 100 includes an outer surface 108. The interior guiding cylinder 102 includes an outer surface 110 having a pair of opposing product chute openings 112a and 112b therein. Product chute openings 106a and 106b are adjacent and in contact with product chute openings 112a and 112b on outer surface 110 of interior guiding cylinder 102. Each of the curved-shaped product chutes 104a and 104b includes a product chute strut 114a and 114b for additional structural support of each product chute 104a and 104b within the conically-shaped mixing chamber 74, as shown in FIG. 3 of the drawings.

It is understood the dispersion nozzle 76 is used for the dispersion of the blended topping ingredient and soft ice cream product 15 from the ingredient mixing assembly 10. Also, the mixing assembly housing 20 when in its assembled configuration further includes an ice cream tunnel/channel 116 for the free flow-through of soft ice cream 14 through the assembled mixing assembly housing 20, as shown in FIG. 3 of the drawings.

First Alternate Embodiment 200

Figure 8:
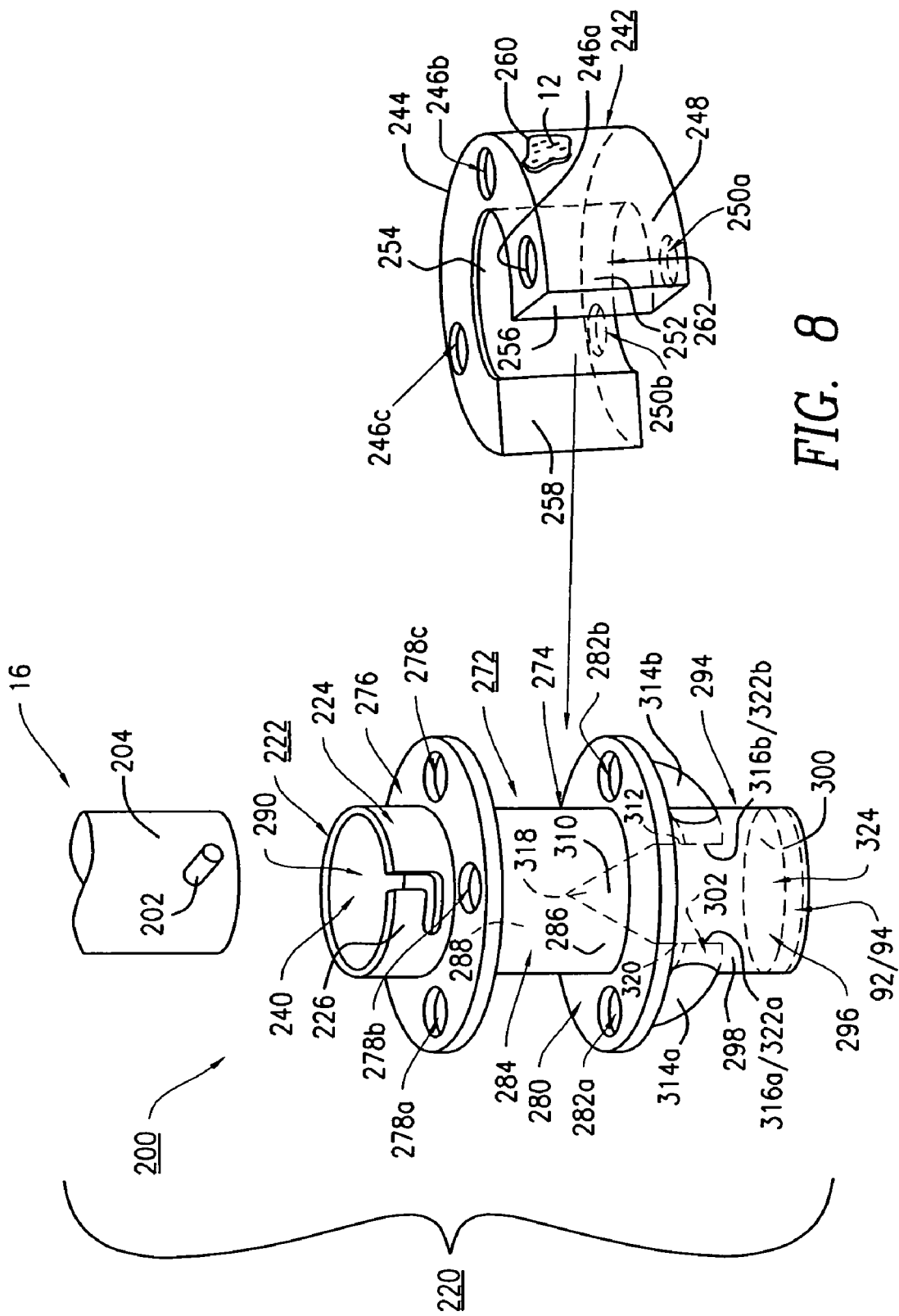
FIG. 8 is an exploded perspective view of the ice cream and topping mixing attachment of the first alternate embodiment of the present invention showing a connector assembly having an L-shaped locking channel, a modified U-shaped topping chamber and a modified mixing chamber.
Figure 9:
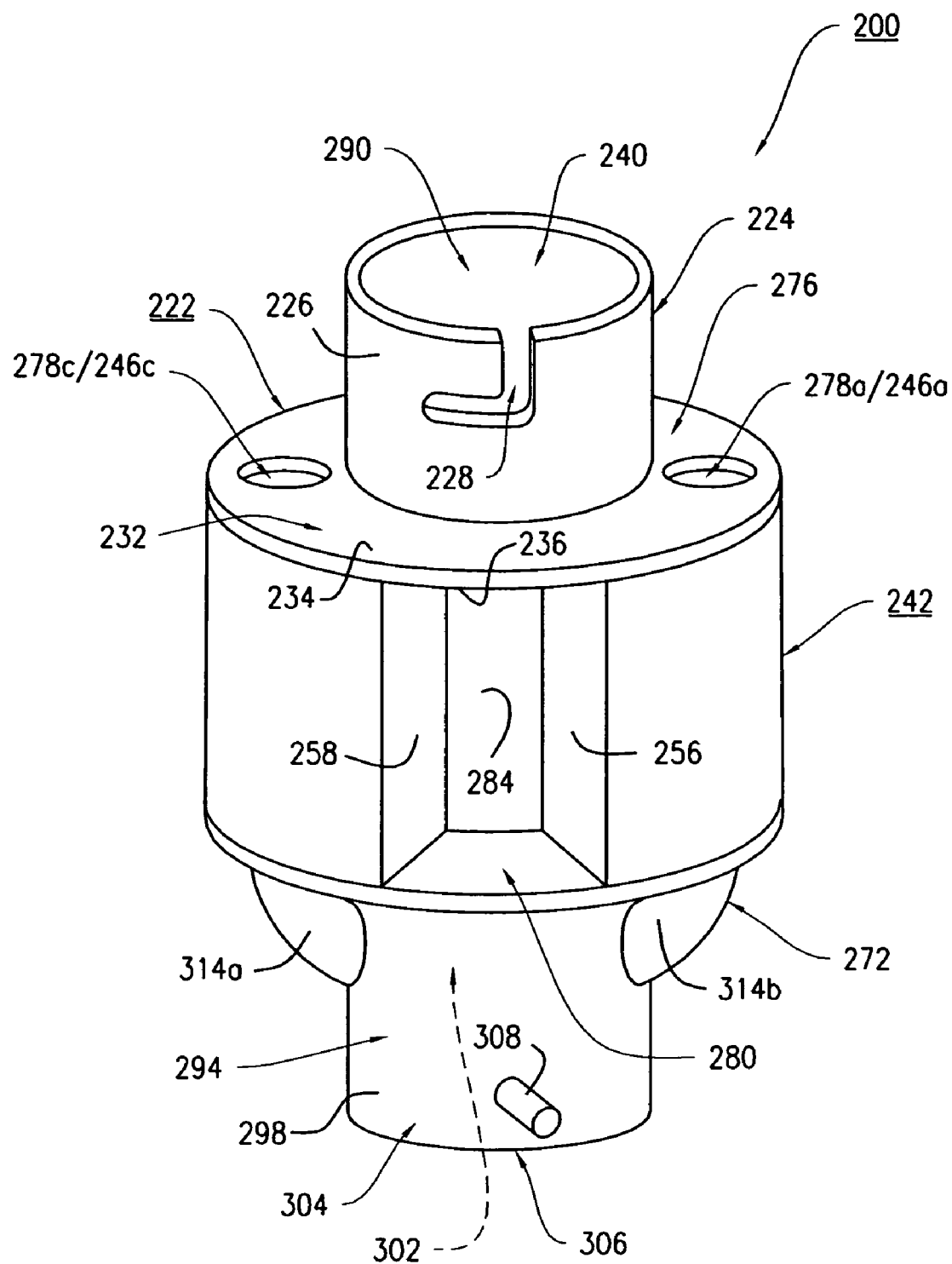
FIG. 9 is an exploded perspective view of the ice cream and topping mixing attachment of the present invention showing the modified U-shaped topping chamber being detachably connected to the modified mixing chamber.
Figure 10:
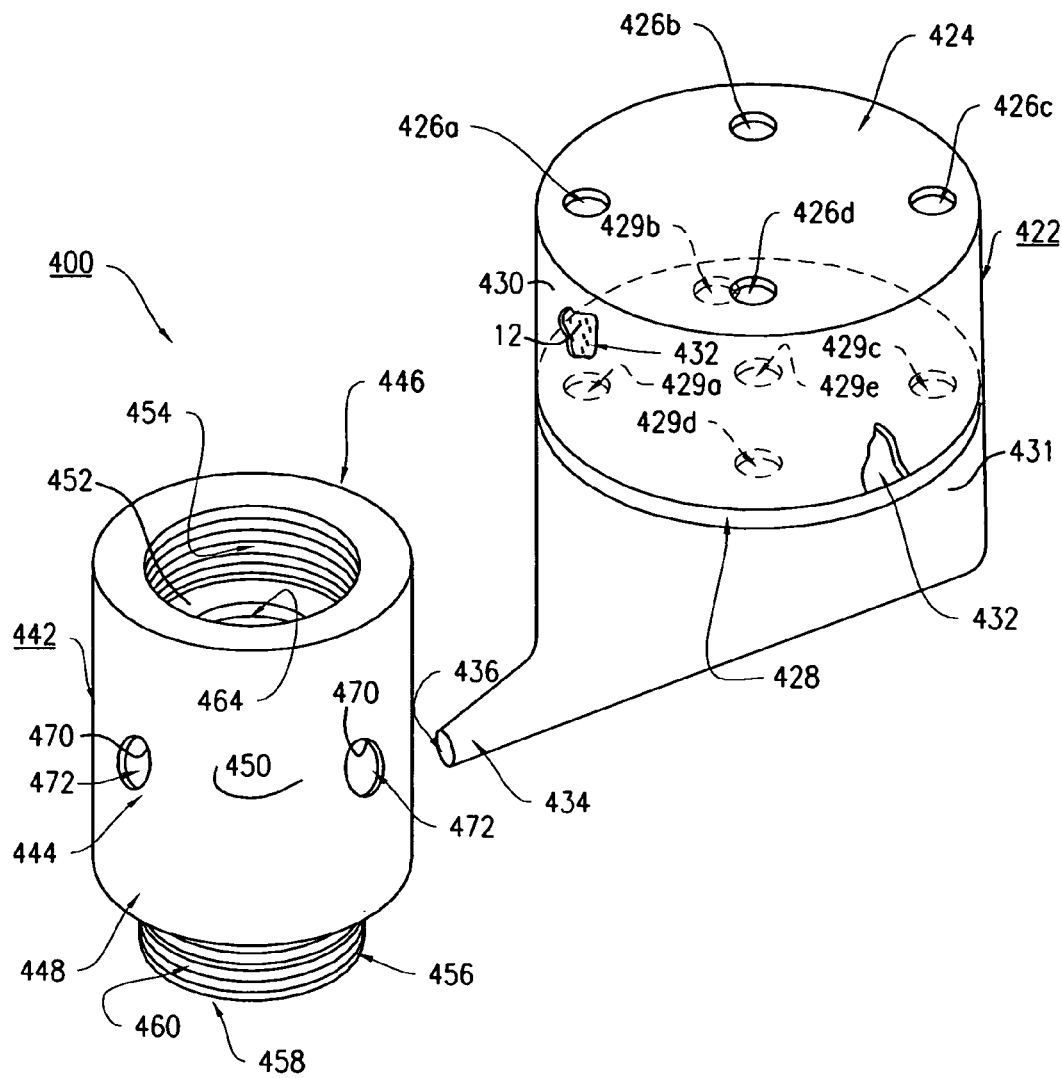
FIG. 10 is an exploded perspective view of the ice cream and topping mixing attachment of the second alternate embodiment of the present invention showing a topping chamber having a dispersion funnel and a modified mixing chamber assembly.
Figure 11:
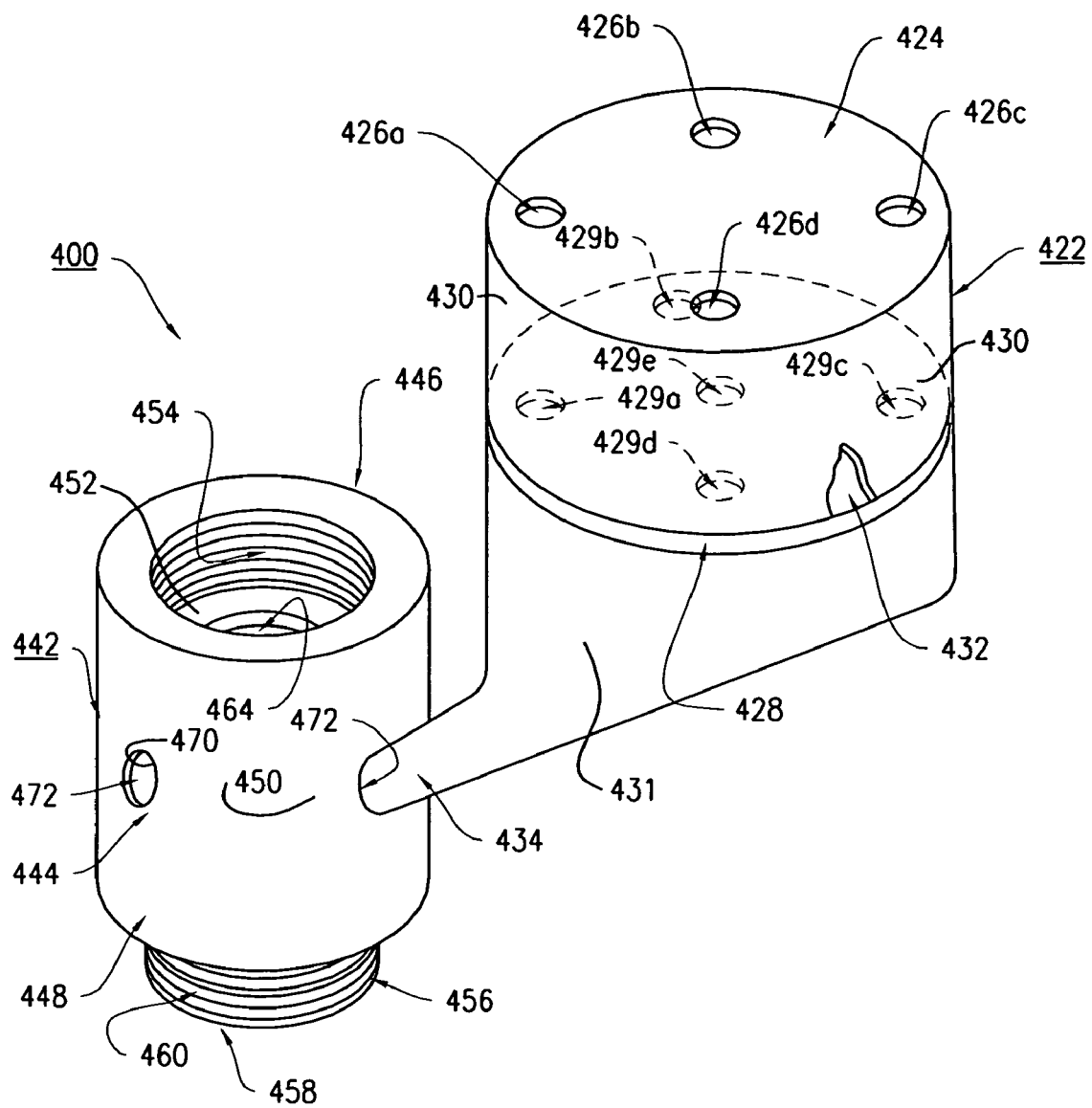
FIG. 11 is a perspective view of the ice cream and topping mixing attachment of the present invention showing the attachment in an assembled state and in an operational mode thereof.

The ice cream and topping mixing attachment 200 and its component parts of the first alternate embodiment of the present invention is represented in detail by FIGS. 8 and 9 of the patent drawings.

As shown in FIGS. 8 and 9, the ice cream and topping mixing attachment or ingredient mixing assembly 200 includes a mixing assembly housing 220 having a connector assembly 222, a modified U-shaped topping chamber 242 having a topping ingredient 12 therein and a modified mixing chamber assembly 272 having an upper holding sub-assembly 274 and a lower mixing chamber sub-assembly 294. The upper holding sub-assembly 274 is used for holding in place the U-shaped topping chamber 242. The lower mixing chamber sub-assembly 294 is used for mixing, blending and dispensing of the topping ingredient 12 and soft ice cream 14 within the lower mixing sub-assembly, as well as the dispensing of the mixed topping ingredient 12 and ice cream 14 from the modified ingredient mixing chamber assembly 272.

The mixing assembly housing 220 and its major component parts 222, 242, and 272 are made from durable and rigid plastic materials, or made from durable and rigid (plastic-coated) cardboard, or other strengthened paper products, or metal. After using the topping ingredient 12 within the U-shaped topping chamber 242, then the ingredient mixing assembly 200 can be discarded and disposed in a conventional manner and replaced with another second ingredient mixing assembly 200 having another reservoir of the same or different topping ingredient 12 within the topping chamber 242 of the ingredient mixing assembly 200 of the present invention. Alternatively, mixing assembly 200 and/or topping chamber 242 may be cleaned and reused.

As shown in FIGS. 8 and 9, the connector assembly 222 includes an upper connector member 224 integrally connected to a support covering plate 232 having a connector assembly opening 240 therethrough. The upper connector member 224 includes a circular perimeter wall 226 having an L-shaped locking channel 228 therein. The L-shaped locking channel 228 of the upper connector member 224 is used for detachably connecting to a bayonet-type connector tab 202 on a dispensing extruder nozzle 204 of the soft ice cream extrusion machine 16, as shown in FIG. 8. The support covering plate 232 includes a top surface 234 and a bottom surface 236. The support covering plate 232 further includes a plurality of equally spaced-apart air vent openings 278a, 278b and 278c extending therethrough.

As shown in FIGS. 8 and 9, the U-shaped topping chamber 242 includes an upper plate 244 having a plurality of equally spaced-apart air vent openings 246a, 246b and 246c therethrough, a lower plate 248 having a pair of opposing product ingredient outlet openings 250a and 250b therethrough, a U-shaped outer perimeter wall 252, a U-shaped inner perimeter wall 254 and side walls 256 and 258 for forming an interior chamber 260 in order to hold a topping ingredient 12 therein and for forming a partial topping chamber opening 262 for receiving a circular perimeter wall 284 of the upper holding sub-assembly 274 of the modified mixing chamber assembly 272. The interior chamber 260 can hold typical topping ingredients 12 selected from the group consisting of dried or hydrated fruit pieces, crushed nuts, candy pieces, seeds, coconut flakes, malt, miniature marshmallows, sprinkles, syrups, chocolate chips and the like. It is understood that the circular perimeter wall 284 of the upper holding sub-assembly 274 slidably receives the U-shaped inner perimeter wall 254 of topping chamber 242, as depicted in FIGS. 8 and 9 of the drawings.

As depicted in FIGS. 8 and 9 of the drawings, the modified mixing chamber assembly 272 includes the upper holding sub-assembly 274 and the lower mixing sub-assembly 294 being integrally connected with each other. The upper holding sub-assembly 274 includes an upper support plate 276 having a plurality of equally spaced-apart air vent openings 278a, 278b and 278c therethrough, a lower support plate 280 having a pair of opposing product ingredient outlet openings 282a and 282b therethrough and an upper circular perimeter wall 284 having a product opening 290 for receiving the soft ice cream 14 therethrough. The upper circular perimeter wall 284 includes an outer surface 286 and an inner surface 288.

The lower mixing chamber sub-assembly 294 includes a lower circular perimeter wall 296 having an outer surface 298 and an inner surface 300 for forming an interior mixing chamber 302. The interior mixing chamber 302 being integrally connected to a cylindrically-shaped dispensing nozzle 304 having a nozzle outlet opening 306. The outer surface 298 of the dispensing nozzle 304 includes a bayonet-type connector tab 308 for connecting to the L-shaped locking channel 228 of a second ingredient mixing assembly 200. The inner surface 300 of the dispensing nozzle 304 also includes an optional upper mixing blade 90 having a mixing blade opening 92 and an optional lower star blade 94 having a star-shaped opening 96.

As shown in FIGS. 8 and 9, the lower mixing chamber sub-assembly 294 further includes an interior guiding cone 310 disposed therein and integrally connected to an interior guiding cylinder 312 having a pair of opposing curved-shaped product chutes 314a and 314b with product chute openings 316a and 316b therethrough for the release and blending of the topping ingredient 12 with the soft ice cream 14 within the interior mixing chamber 302. The interior guiding cone 310 includes an outer surface 318. The interior guiding cylinder 312 includes an outer surface 320 having a pair of opposing product chute openings 322a and 322b therein. Product chute openings 316a and 316b are adjacent and in contact with product chute openings 322a and 322b on outer surface 320 of interior guiding cylinder 312.

It is understood the dispersion nozzle 304 is used for the dispersion of the blended topping ingredient and soft ice cream product 15 from the ingredient mixing assembly 200. Also, the mixing assembly housing 220 when in its assembled configuration further includes an ice cream tunnel/channel 324 for the free flow-through of soft ice cream 14 through the assembled mixing assembly housing 220, as shown in FIGS. 8 and 9 of the drawings.

Second Alternate Embodiment 400

The ice cream and topping mixing attachment 400 and its component parts of the second alternate embodiment of the present invention is represented in detail by FIGS. 10 through 13 of the patent drawings.

As shown in FIGS. 10 through 13, the ice cream and topping mixing attachment or ingredient mixing assembly 400 includes a mixing assembly housing 420 having a topping chamber 422 and a mixing chamber assembly 442. The topping chamber 422 includes a top wall 424 having a plurality of equally spaced-apart air vent openings 426a, 426b, 426c and 426d extending therethrough, a bottom wall 428 having a plurality of spaced-apart product openings 429a, 429b, 429c, 429d and 429e extending therethrough, and an outer circular wall 430 for forming an interior chamber 432 in order to hold a topping ingredient 12 therein. The outer circular wall 430 includes a funnel member 434 adjacently connected to the bottom wall 428 for the flow of topping ingredients 12 from the topping chamber 422. The funnel member 434 includes a funnel opening 436 for dispensing the topping ingredients 12 from the interior chamber 432 of topping chamber 422. The interior chamber 432 can hold typical topping ingredients 12 selected from the group consisting of dried or hydrated fruit pieces, crushed nuts, candy pieces, seeds, coconut flakes, malt, miniature marshmallows, sprinkles, syrups, chocolate chips and the like. It is understood that prior to use that only the interior chamber 432 of topping chamber 422 will hold the topping ingredients 12. Also, the outer circular wall 430 is rotated relative to 426a to 426d and 429a to 429d so that they are aligned with each other such that the topping ingredients 12 can flow from the topping chamber 422 through the funnel member 434 to the funnel opening 436.

The mixing chamber assembly 442 includes an outer circular perimeter wall 444 having a proximal end 446 and distal end 448. The outer circular perimeter wall 444 includes an outer surface 450 and an inner surface 452. The inner surface 452 at the proximal end 446 includes an inner threaded wall surface 454. The threaded wall surface 454 is used for detachably connecting to a dispensing extruder nozzle 18 of the soft ice cream extrusion machine 16. The distal end 448 of the mixing chamber assembly 442 includes an integrally connected cylindrically-shaped dispensing nozzle 456 having a nozzle outlet opening 458, an outer threaded perimeter surface 460 and an inner perimeter surface 462. The cylindrically-shaped dispensing nozzle 456 also includes an optional upper mixing blade 90 having a mixing blade opening 92 and an optional lower star blade opening 94 having a star-shaped opening 96.

Figure 12:
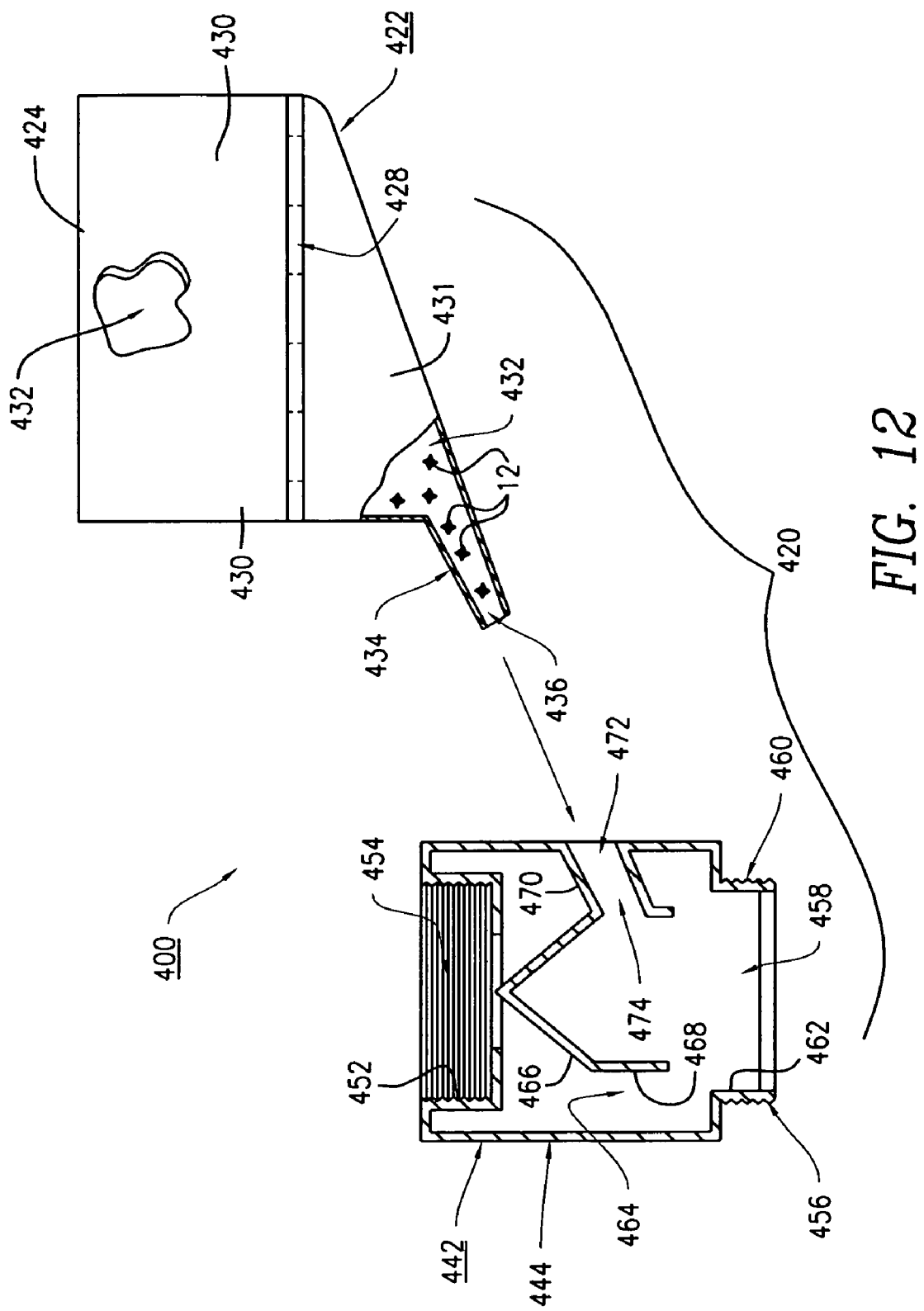
FIG. 12 is a cross-sectional view of the ice cream and topping mixing attachment of the present invention showing the topping chamber having the dispersion funnel and the modified mixing chamber assembly.
Figure 13:
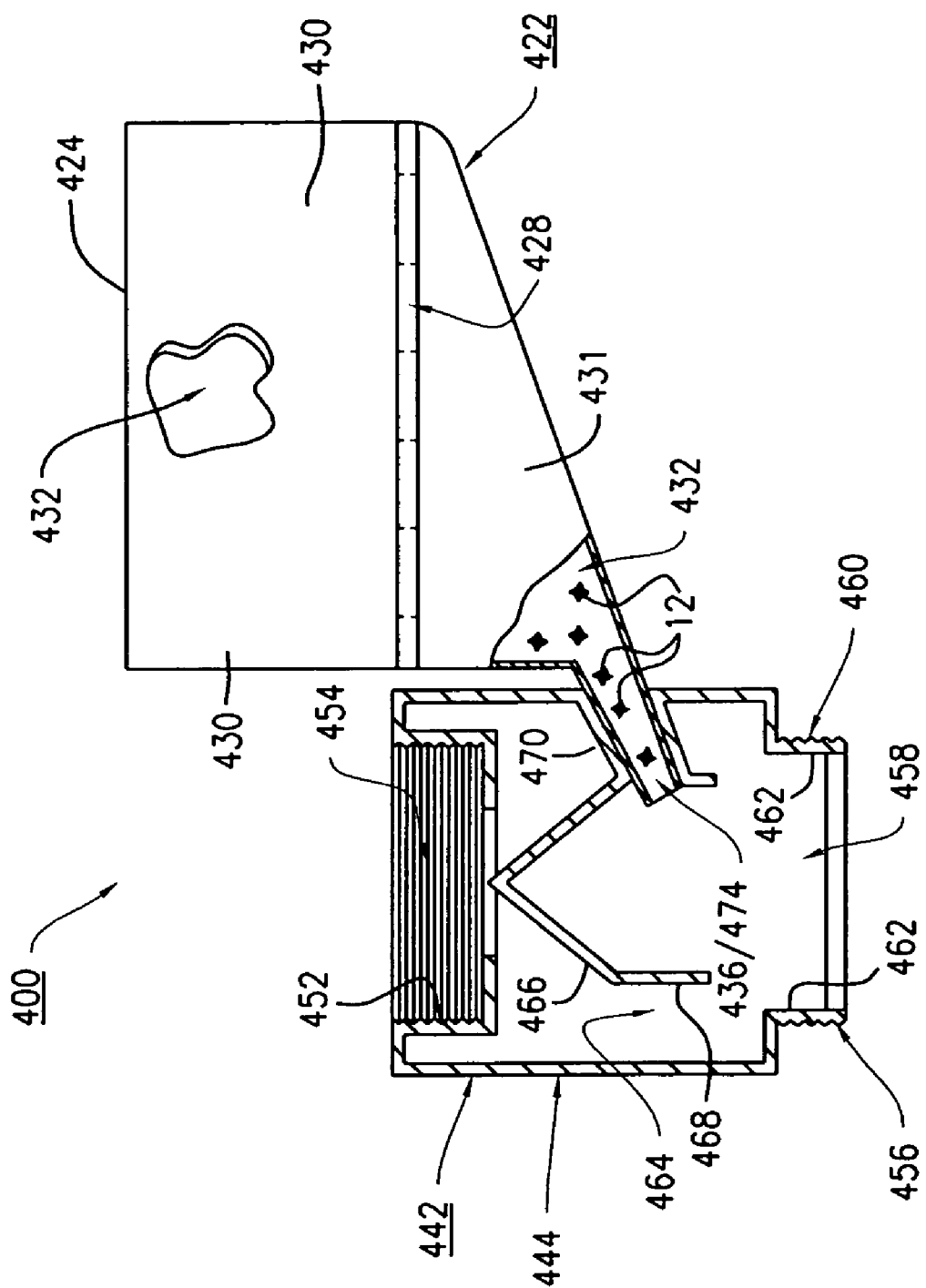
FIG. 13 is a cross-sectional view of the ice cream and topping mixing attachment of the present invention showing the attachment in the assembled state and in an operational mode.

As shown in FIGS. 12 and 13, the mixing chamber assembly 442 further includes an interior mixing chamber 464 and an interior guiding cone 466 disposed therein being integrally connected to an interior guiding cylinder 468 having a product chute passageway 470 with passageway openings 472 and 474. Passageway openings 472 and 474 of product chute passageway 470 are for receiving funnel member 434 therethrough, as depicted in FIG. 13. Funnel opening 436 and passageway opening 474 are adjacent and co-eccentric with each other, as shown in FIG. 13, for the release and blending of the topping ingredient 12 with the soft ice cream 14 within the interior mixing chamber 464.

Operation of the Present Invention

As shown in FIGS. 1, 2 and 3 of the drawings, the mixing machine housing 20 is pre-assembled with its major component parts which are the connector assembly 22, the topping chamber 42, the topping chamber support plate 62 and the mixing chamber assembly 72 (see FIG. 2). Each of these component parts 22, 42, 62 and 72 may be manufactured by stamp molding and/or injecting molding and/or any other known method, and the component parts are assembled.

The interior topping chamber 56 is prefilled with a topping ingredient 12 through a top opening 47 before top plate 44 is attached. The topping ingredient 12 is then filled to capacity within the interior topping chamber 56 of topping chamber 42. After the topping chamber 42 is filled, it is placed on top of plate 62, so that the product outlet openings 50a and 50b of bottom plate 51 of topping chamber 42 are positioned in an out of alignment configuration relative to product ingredient outlet openings 68a and 68b of support plate 62, respectively. Then support covering plate 32 is connected to the top surface 44 of topping chamber 42 with air vent openings 38a to 38d out of alignment relative to air vent openings 46a to 46d on the upper plate 44 of topping chamber 42. Then the assemblies 24, 42, 62 are connected to the mixing chamber assembly 72 and the mixing attachment assembly 10 is now ready for use.

In an alternative method of assembly, the interior topping chamber 56 is attached to the support plate 62 such that product outlet openings 50a and 50b of bottom plate 51 and product outlet openings 68a and 68b of support plate 62 have an out of alignment configuration. The interior topping chamber 56 is then prefilled with a topping ingredient 12 through the top opening 47 before top plate 44 is attached. The topping ingredient 12 is then prefilled to capacity within the interior topping chamber 56 of topping chamber 42. Then support covering plate 32 is connected to the top surface 44 of topping chamber 42 with air vent openings 38a to 38d out of alignment relative to air vent openings 46a to 46d on the upper plate 44 of topping chamber 42. Then the assemblies 24, 42 and 62 are connected to the mixing chamber assembly 72 and the mixing attachment assembly 10 is now ready for use.

It is understood the vent openings 38a to 38d of support cover plate 32 and air vent openings 46a to 46d of top plate 44, as well as product outlet openings 50a and 50b of bottom plate 51 and product outlet openings 68a and 68b of lower support plate 62 are not in alignment until activation of the mixing attachment assembly 10 takes place. The product outlet openings 68a and 68b of lower support plate 62 and product inlet openings 106a and 106b of mixing chamber assembly 72 are always aligned when they are connected.

When the user is ready to dispense the topping ingredients 12 from topping chamber 42, the aforementioned air vent openings 38a to 38d and 46a to 46d and product outlet openings 50a and 50b, 68a and 68b and 106a and 106b are all moved into alignment by twisting the outer circular perimeter wall 52 relative to the upper plate 32 and lower support plate 62. In this manner, the aforementioned hole openings are aligned such that the topping ingredients 12 flow freely through these openings.

Before the alignment of the opposing product outlet openings 50a and 5Ob on the lower plate 48 of the topping chamber 42 with that of the opposing product outlet openings 68a and 68b on the topping chamber support plate 62, the lower plate 48 and upper surface 64 of plate 62 are then sealed together with the use of non-toxic glue, epoxy cement, laser welding, or clipped together. The opposing product outlet openings 68a and 68b on the lower surface 66 of the topping chamber support plate 62 are aligned with the opposing chute openings 106a and 106b of opposing curve-shaped product chutes 104a and 104b, respectively, of mixing chamber assembly 72, from the time they are initially assembled. Then the perimeter edging 70 along the lower surface 66 of the topping chamber support plate 62 is sealed to the perimeter edging 75 of the conically-shaped mixing chamber 74 (see FIG. 2) with the use of glue, epoxy cement, laser welding, or by clipping them together for forming the assembled mixing machine housing 20, as shown in FIG. 1 of the drawings.

In operating the ice cream and topping mixing attachment 10 of the preferred embodiment of the present invention, as shown in FIGS. 1, 3 and 7, the operational steps are as follows: Prior to the start of the operation, the support cover plate 32 is clamped to the topping chamber 42 with the air vent openings 38a to 38d, and 46a to 46d not in alignment, respectively. Initially, the user detachably connects the dispensing extruder nozzle 18 of the soft ice cream extrusion machine 16 to the inner threaded wall surface 30 of the upper connector member 24 of the connector assembly 22 of the assembled mixing assembly housing 20. Ice cream 14 now starts to flow until the ice cream 14 reaches mixing blades 94 and 96 and then stops. The user now takes hold of the outer perimeter wall 52 and turns the outer perimeter wall 52 clockwise until the air vent openings 38a to 38d and 46a to 46d are aligned. Once the aforementioned air vent openings are aligned the product outlet openings 50*a* and 50*b*, and 68*a* and 68*b*, are automatically aligned.

This aforementioned step allows for the free flow of the topping ingredient 12 through the curve-shaped product chutes 104*a* and 104*b* and product chute openings 106*a* and 106*b*, respectively, in order to release and blend the topping ingredient 12 with soft ice cream 14 within the interior mixing chamber 78, as shown in FIG. 3. The free flow of the soft ice cream 14 through the ice cream channel 116 disperses the topping ingredient 12 within the interior mixing chamber 78, as shown in FIG. 3, for producing a blended topping ingredient and soft ice cream product 15. The force and flow of the ice cream 14 coming down the ice cream channel 116 is mixing the ice cream 14 with the topping ingredient 12 to produce the aforementioned blended topping ingredient and soft ice cream product 15. Further, as shown in FIG. 3, the soft ice cream 14 is guided around the outer surfaces 108 and 110 of the interior guiding cone 100 and interior guiding cylinder 102, respectively, in order to create a peripheral ice cream flow 118 and the topping ingredient 12 is transferred by the product ingredient chutes 104*a* and 104*b* and product chute openings 106*a* and 106*b*, respectively, allowing the topping ingredient 12 to blend within the inside areas 119 of the peripheral ice cream flow 118 (as shown in FIG. 3) for producing the aforementioned blended topping ingredient and soft ice cream product 15 within the interior mixing chamber 78.

In the last step, the blended topping ingredient and soft ice cream product 15 is dispersed from the dispersion nozzle 76 of the assembled mixing assembly housing 20, as shown in FIG. 3. Optionally, as shown in FIG. 7, multiple ingredient mixing assemblies 10, 10' and 10" may be attached together by the user in order to have different topping ingredients 12, 12' and 12" blended-in with the soft ice cream 14 being dispersed from the last dispersion nozzle 76" of the assembled mixing assembly housing 20".

Also, it should be understood that the cylindrically-shaped dispersion nozzle 76" may include mixing blade 90/92 for the mixing of topping ingredients 12, and/or a star blade 94/96 for producing a star-shaped ice cream product 15 from the dispersion nozzle 76, as shown in FIG. 7 of the drawings. Further, prior to the ice cream 14 coming out of the dispersion nozzle 76, if the mixing blade 92 is not activated, then the topping ingredients 12 will be within the core of the ice cream 14, and if the mixing blade 92 is activated, then the topping ingredients 12 will be mixed throughout the ice cream 14.

Alternate embodiments 200 and 400 operate in a similar manner to the preferred embodiment 10 described above.

ADVANTAGES OF THE PRESENT INVENTION

Accordingly, an advantage of the present invention is that it provides for an ice cream and topping mixing attachment for dispensing a topping ingredient within the soft ice cream.

Another advantage of the present invention is that it provides for an ice cream and topping mixing attachment being detachable and disposable having a prefilled topping chamber containing topping ingredients therein which is detachably connected to a standard soft ice cream machine.

Another advantage of the present invention is that it provide an ice cream and topping mixing attachment that mixes and blends the topping ingredient and the soft ice cream within a mixing chamber and the mixed blend is then dispensed from a dispensing nozzle.

Another advantage of the present invention is that it provides for an ice cream and topping mixing attachment that can be easily attached to a second ice cream and topping mixing attachment such that multiple topping ingredients can be added to a serving of soft ice cream.

Another advantage of the present invention is that it provides an ice cream and topping mixing attachment that uses an optional mixing blade to blend the topping ingredient and the soft ice cream together, and an optional molding (star mold) blade when dispensing the mixture.

Another advantage of the present invention is that it provides for an ice cream and topping mixing attachment that uses a topping ingredient selected from the group consisting of dried fruit pieces, crushed nuts, candy pieces, seeds, coconut flakes, miniature marshmallows, sprinkles, syrups, chocolate chips and the like.

Another advantage of the present invention is that it provides for an ice cream and topping mixing attachment that can be mass produced in an automated and economical manner and is readily affordable by the store owner and/or manufacturer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An ice cream and topping mixing attachment for being detachably connected to a soft ice cream machine for the mixing of a topping ingredient with ice cream, comprising:
   a) a mixing attachment housing having a connector assembly for detachably connecting said mixing attachment housing to a standard soft ice cream machine;
   b) a topping chamber connected to said connector assembly for holding and dispensing a topping ingredient therein;
   c) a mixing chamber assembly connected to said topping chamber for mixing and blending the topping ingredient and soft ice cream within said mixing chamber assembly and for dispensing a blended topping ingredient and soft ice cream from said mixing chamber assembly;
   d) said connector assembly includes an upper connector member for detachably connecting said ice cream and topping mixing attachment to the standard soft ice cream machine; and
   e) said connector assembly further includes a support covering plate connected to said upper connector member; said support covering plate having a connector assembly opening for receiving ice cream therethrough from the soft ice cream machine and also having a plurality of spaced-apart air vents for allowing the free flow of the topping ingredient from said topping chamber to said mixing chamber assembly.

2. An ice cream and topping mixing attachment in accordance with claim 1, wherein said lower plate of said topping chamber includes a topping chamber support plate for additional structural support of said topping chamber.

3. An ice cream and topping mixing attachment in accordance with claim 2, wherein said topping chamber support plate includes second product ingredient outlet openings within said support plate and a support plate opening for receiving ice cream therethrough from the soft ice cream machine.

4. An ice cream and topping mixing attachment in accordance with claim 1, wherein said mixing chamber assembly includes a conically-shaped mixing chamber connected to a cylindrically-shaped dispersion nozzle for forming an interior mixing chamber.

5. An ice cream and topping mixing attachment in accordance with claim 4, wherein said dispersion nozzle is for the dispersion of the blended topping ingredient and ice cream from said mixing attachment housing to a user.

6. An ice cream and topping mixing attachment in accordance with claim 4, wherein said dispersion nozzle includes a mixing blade having a mixing blade opening being positioned within said dispersion nozzle for blending-in of the topping ingredient with the ice cream.

7. An ice cream and topping mixing attachment in accordance with claim 4, wherein said dispersion nozzle includes an optional shaping blade having a shaped opening being positioned within said dispersion nozzle for shaping the ice cream.

8. An ice cream and topping mixing attachment in accordance with claim 4, wherein said dispersion nozzle includes means for attaching in the form of an outer threaded perimeter wall surface and an inner smooth perimeter surface.

9. An ice cream and topping mixing attachment in accordance with claim 1, wherein said topping chamber includes topping ingredients selected from the group consisting of dried or hydrated fruit pieces, crushed nuts, candy pieces, seeds, coconut flakes, malt, miniature marshmallows, sprinkles, chocolate chips, syrups, and the like.

10. An ice cream and topping mixing attachment in accordance with claim 1, wherein each of said curved-shaped product chutes include a product chute strut for additional structural support of said product chute within said conically-shaped mixing chamber.

11. An ice cream and topping mixing attachment in accordance with claim 1, wherein said mixing attachment housing is made from durable and rigid plastic materials.

12. An ice cream and topping mixing attachment in accordance with claim 1, wherein said mixing attachment housing is made from materials selected from the group consisting of durable, plastic coated and rigid cardboard, other strengthened paper products, and metals.

13. An ice cream and topping mixing attachment in accordance with claim 1, wherein said connector assembly includes means for attachment in the form of a screw attachment, a lock and key attachment, a suction attachment, a pressure attachment, a flat plate male to female connector, or equivalents thereof.

14. An ice cream and topping mixing attachment for being detachably connected to a soft ice cream machine for the mixing of a topping ingredient with ice cream, comprising:
 a) a mixing attachment housing having a connector assembly for detachably connecting said mixing attachment housing to a standard soft ice cream machine;
 b) a U-shaped topping chamber connected to said connector assembly for holding and dispensing a topping ingredient contained therein; and
 c) a mixing chamber assembly including an upper holding sub-assembly and said U-shaped topping chamber detachably connected to said upper holding sub-assembly and including a lower mixing sub-assembly connected to said topping chamber for mixing and blending the topping ingredient and soft ice cream within said mixing chamber assembly and for dispensing a blended topping ingredient and soft ice cream from said mixing chamber assembly.

15. An ice cream and topping mixing attachment for being detachably connected to a soft ice cream machine for the mixing of a topping ingredient with ice cream, comprising:
 a) a mixing attachment housing having one or more topping chambers and a mixing chamber assembly; said mixing chamber assembly for detachably connecting to a standard soft ice cream machine;
 b) said one or more topping chambers each having a funnel member for holding and dispensing a topping ingredient contained therein;
 c) said mixing chamber assembly having openings each for connecting to said one or more funnel members of said topping chamber for mixing and blending the topping ingredient and soft ice cream within said mixing chamber assembly and for dispensing a blended topping ingredient and soft ice cream from said mixing chamber assembly; and
 d) wherein each of said one or more funnel members are detachably connected to a product chute passageway within said mixing attachment housing.

16. An ice cream and topping mixing attachment for being detachably connected to a soft ice cream machine for the mixing of a topping ingredient with ice cream, comprising:
 a) a connector assembly for detachably connecting a mixing attachment housing to a standard soft ice cream machine;
 b) said mixing attachment housing including one or more detachable topping chambers for holding and dispensing a topping ingredient contained therein; and
 c) a mixing chamber assembly having openings for connecting to each of said detachable topping chambers for mixing and blending the topping ingredient and soft ice cream within said mixing chamber assembly and for dispensing a blended topping ingredient and soft ice cream from said mixing chamber assembly.

17. An ice cream and topping mixing attachment for being detachably connected to a soft ice cream machine for the mixing of a topping ingredient with ice cream, comprising:
 a) a mixing attachment housing having a connector assembly for detachably connecting said mixing attachment housing to a standard soft ice cream machine;
 b) a topping chamber connected to said connector assembly for holding and dispensing a topping ingredient therein;
 c) a mixing chamber assembly connected to said topping chamber for mixing and blending the topping ingredient and soft ice cream within said mixing chamber assembly and for dispensing a blended topping ingredient and soft ice cream from said mixing chamber assembly; and
 d) said mixing chamber assembly further includes an interior guiding cone disposed therein and connected to an interior guiding cylinder having curved-shaped product chutes with product chute openings for the release and blending of the topping ingredient with the ice cream within said interior mixing chamber.

18. An ice cream and topping mixing attachment in accordance with claim 17, wherein each of said curved-shaped product chutes include a pocket chute strut for additional structure support of said product chute within said conically-shaped mixing chamber.

19. An ice cream and topping mixing attachment in accordance with claim 17, wherein said mixing chamber assembly includes a conically-shaped mixing chamber connected to a cylindrically-shaped dispersion nozzle for forming an interior mixing chamber.

20. An ice cream and topping mixing attachment in accordance with claim 17, wherein said dispersion nozzle includes an optional shaping blade having a shaped opening being positioned within said dispersion nozzle for shaping the ice cream.

21. An ice cream and topping mixing attachment in accordance with claim 17, wherein said topping chamber includes topping ingredients selected from the group consisting of dried or hydrated fruit pieces, crushed nuts, candy pieces, seeds, coconut flakes, malt, miniature marshmallows, sprinkles, chocolate chips, syrups, and the like.

22. An ice cream and topping mixing attachment for being detachably connected to a soft ice cream machine for the mixing of a topping ingredient with ice cream, comprising:
   a) a mixing attachment housing having a connector assembly for detachably connecting said mixing attachment housing to a standard soft ice cream machine;
   b) a topping chamber connected to said connector assembly for holding and dispensing a topping ingredient therein;
   c) a mixing chamber assembly connected to said topping chamber for mixing and blending the topping ingredient and soft ice cream within said mixing chamber assembly and for dispensing a blended topping ingredient and soft ice cream from said mixing chamber assembly; and
   d) said topping chamber includes an upper plate having a plurality of spaced-apart air vents, a lower plate having first product ingredient outlet openings, said upper and lower plates being connected to inner and outer perimeter walls for forming an interior chamber for holding the topping ingredient therein; said topping chamber having a topping chamber opening extending therethrough for receiving ice cream therethrough from the soft ice cream machine.

23. An ice cream and topping mixing attachment in accordance with claim 22, wherein said lower plate of said topping chamber includes a topping chamber support plate for additional structural support of said topping chamber.

24. An ice cream and topping mixing attachment for being detachably connected to a soft ice cream machine for the mixing of a topping ingredient with ice cream, comprising:
   a) a mixing attachment housing having a connector assembly for detachably connecting said mixing attachment housing to a standard soft ice cream machine;
   b) a topping chamber connected to said connector assembly for holding and dispensing a topping ingredient therein;
   c) a mixing chamber assembly connected to said topping chamber for mixing and blending the topping ingredient and soft ice cream within said mixing chamber assembly and for further including a dispersion nozzle for dispensing a blended topping ingredient and soft ice cream from said mixing chamber assembly; and
   d) said dispersion nozzle is for detachably connecting to said connector assembly of another mixing attachment housing in order to supply different topping ingredients for blending with the soft ice cream being dispersed from another dispersion nozzle.

* * * * *